Figures 1, 2:
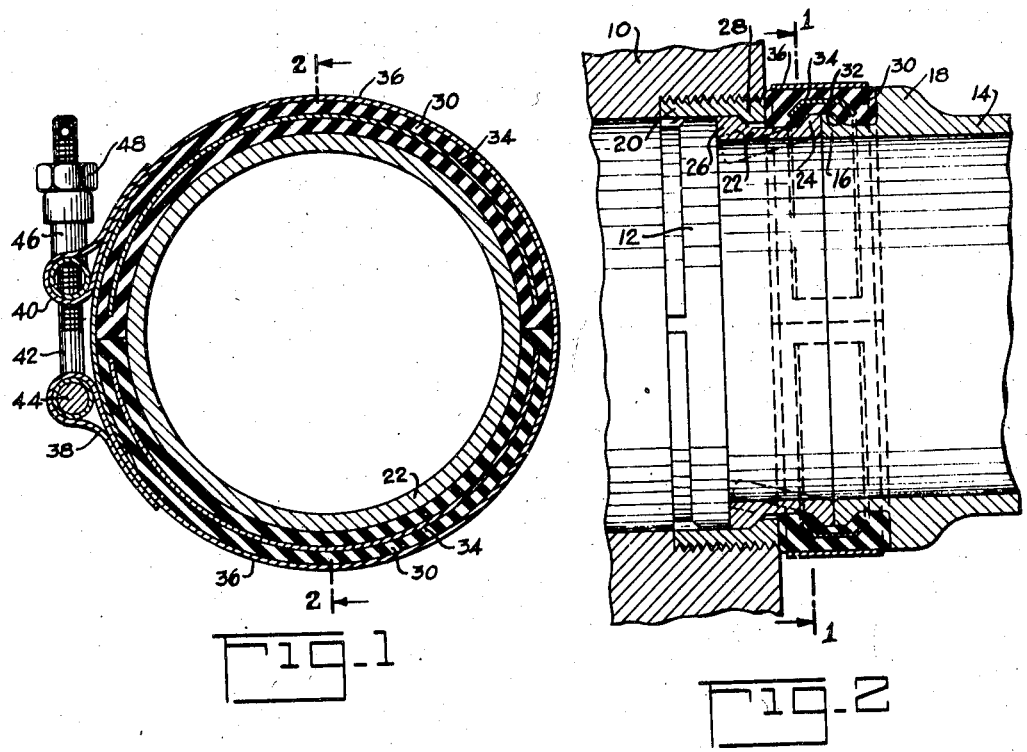

Feb. 8, 1949.   W. H. FRANCISCO, JR., ET AL   2,460,981
PIPE CONNECTION
Original Filed June 6, 1944

INVENTORS
HENRY C. HILL
WILLIAM H. FRANCISCO, JR.
EDWARD C. STEINER
BY Victor A. Baker
ATTORNEY Patented Feb. 8, 1949

2,460,981

UNITED STATES PATENT OFFICE 2,460,981

PIPE CONNECTION

William H. Francisco, Jr., Bloomfield, N. J., Edward C. Steiner, Dallas, Tex., and Henry C. Hill, Pasadena, Calif., assignors to Wright Aeronautical Corporation, a corporation of New York Original application June 6, 1944, Serial No. 538,964. Divided and this application November 25, 1947, Serial No. 787,938

4 Claims. (Cl. 285—129)

This invention is a division of application Serial No. 538,964, filed June 6, 1944, and relates to hose or pipe clamps and more particularly to a hose or pipe clamp capable of withstanding high internal pressures, and at the same time, permitting flexibility between the pipe parts clamped together and occupying very little space. The clamp has been designed to provide means for securing an intake pipe of an internal combustion engine to a cylinder head. However, as will appear from the following description, the clamp is not limited to this particular use, but is of general application.

In a radial cylinder engine in which the cylinders are radially mounted about a crankcase, there is a substantial amount of relative vibration between the various cylinder heads and the crankcase, and accordingly there is considerable relative movement between the two ends of each of the intake pipes. Also, when the engine backfires, there is considerable pressure in the associated intake pipes. Accordingly, it is an object of this invention to provide clamping means for securing an intake pipe to its cylinder head and which is capable of withstanding high pressures, and at the same time provides some flexibility between the parts connected. Also, because of space limitations on aircraft engines, it is a further object of this invention to provide a clamp occupying very little space.

Other objects of this invention will become apparent upon reading the annexed detailed description in connection with the drawing in which:

Figure 1 is a transverse sectional view through a clamp embodying the invention and taken along line 1—1 of Figure 2; and Figure 2 is an axial section taken along line 2—2 of Figure 1.

Referring to the drawing, a portion of an engine cylinder head is indicated at 10 and is provided with an intake port 12 and intake pipe 14 adapted to be secured thereto. The cylinder head end of the intake pipe is provided with an annular outwardly directed flange or bead 16 and with an annular outwardly directed shoulder 18 axially spaced from the flange 16.

An adapter sleeve 20 is threadedly secured to the cylinder head about the open end of its inlet port 12 and a short pipe or nipple 22 is slidably fitted within the adapter sleeve and extends therefrom. The nipple 22 is provided with an outwardly directed annular flange or bead 24 similar to the flange or bead 16 on the intake pipe and adapted to abut thereagainst. The remote sides of the flanges or beads 16 and 24 are conical, thereby providing a composite cross-section having a truncated V-shape. The other end of the nipple 22 is also provided with an annular external bead or flange 26 and the outer end of the adapter sleeve 20 is provided with an inwardly directed annular flange 28. In order to permit assembly of the nipple within the adapter sleeve, the nipple is originally formed with an inwardly directed taper at its inner end, as indicated by the dotted outline in Figure 2. After the tapered end of the nipple has been inserted within the adapter sleeve, this tapered end is outwardly swaged to the condition illustrated by the full lines in Figure 2, thereby mechanically interlocking these members. The outer diameter of the nipple between its end flanges or beads is somewhat less than the inner diameter of the adapter flange 28, thereby permitting relative movement between these members.

A pair of semi-circular members 30 of rubber or other resilient material are disposed about the abutting ends of the nipple and intake pipe, and in addition are disposed between the cylinder head and the annular shoulder 18 on the intake pipe. Each semi-circular member 30 is provided with an internal groove 32 having a truncated V-shaped cross-section corresponding to the cross-sectional shape of the abutting flanges 24 and 16. Furthermore, each semi-circular resilient member 30 is reinforced by a semi-circular metallic strip 34, having an inwardly opening channel-shaped cross section symmetrically disposed relative to the groove 32. The channel sides of the metallic strips 34 extend inwardly to such an extent that their inner diameter is less than the outer diameter of the flanges 16 and 24, thereby providing positive mechanical interference against axial separation of the pipe 14 and the nipple 22.

A suitable clamp is disposed about the semi-circular resilient members 30. As illustrated, this clamp comprises a flexible metallic band 36 substantially surrounding the members 30 and having looped portions 38 and 40 at its ends. A clamping bolt 42 is provided with a T-shaped head 44 which is adapted to be received within the loop portion 38 with the bolt stem extending through a slot in this looped portion. A T-shaped tubular guide member 46, through which the bolt 42 extends, is similarly carried by the other looped portion 40. A nut 48 on the bolt 42 is adapted to be threaded against a tubular guide portion 46 to draw the loop portions 38 and 40 together, thereby tightening the flexible band 36 about the resilient members 30. The invention is not limited to this particular means for drawing the ends of the clamping band together.

With this construction, as the two semi circular resilient members 30 are clamped in position by the band 36, the truncated V-shaped cross-section of the flanges 16 and 24 and the annular groove 32 results in these flanges being wedged or tightly drawn together and at the same time, the sides of the resilient members 30 are squeezed between the cylinder head and shoulders 18 on the intake pipe. In this way the interior of the intake pipe and cylinder head port are tightly sealed, and are flexibly secured together. The loose fit between the nipple 22 and adapter sleeve 20 permits relative movement therebetween against the resiliency of the rubber-like members 30. In addition, the resilient members 30 permit limited relative lateral motion of the nipple 22 and the intake pipe 14. The reinforcing band 34 prevents the resilient members 30 from being blown out as a result of the high pressures which may occur with the intake pipe, that is, in the case of a backfire.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In combination with a pair of pipes adapted to be secured together in end-to-end relation; each of said pipes having an annular external bead adjacent its end facing the other of said pipes; a pair of semi-circular rigid members of inwardly opening channel-shaped cross-section adapted to be disposed about and bridging across the adjacent ends of said pipe members with said beads disposed between the inwardly extending channel sides of said members, the channel sides of said members terminating in spaced relation to said pipes and each having an internal diameter less than the maximum diameter of the adjacent one of said beads; resilient rubber-like means having at least a portion adapted to be disposed between said semi-circular members and said pipes, said resilient means having preformed internal groove means adapted to receive said beads; and a flexible band also bridging the adjacent ends of said pipes and having a width approximately equal to the width of said semi-circular members, said band being adapted to tightly draw said semi-circular members and said resilient means about said pipes.

2. In combination with a body having an opening and a nipple extending therefrom; a pipe adapted to be secured to said body and nipple in abutting relation with said nipple; the abutting ends of said pipe and nipple each having an external annular flange, said pipe also having an external annular shoulder facing said body; a pair of semi-circular members of resilient rubber-like material disposed about the junction of said nipple and pipe and between said body and said shoulder; said resilient members each having a groove for receiving said flanges; said flanges and groove being of such cross-section that as said resilient members are pressed inwardly, said flanges are wedged toward each other, a flexible member adapted to be drawn about said resilient members for pressing them inwardly, whereupon said flanges are wedged toward each other and said resilient members are squeezed between said body and said shoulder; and a reinforcing member of inwardly opening channel-shaped cross-section embedded within each of said resilient members, the sides of said channel-shaped member being arranged to straddle said flanges.

3. In combination with a pair of pipes adapted to be secured together in end-to-end relation; each of said pipes having an annular external bead adjacent its end facing the other of said pipes; annular means comprising a pair of semi-circular members of resilient rubber-like material disposed about the junction of said pipes, means for drawing said semi-circular resilient members about said pipes; and a reinforcing member of inwardly opening channel-shaped cross-section embedded within each of said resilient members, the sides of each channel-shaped reinforcing member being arranged to straddle said beads and each side of said channel-shaped reinforcing members having a minimum internal radius smaller than the maximum radius of the adjacent one of said beads.

4. In combination with a pair of pipes adapted to be secured together in end-to-end relation; each of said pipes having an axially rigid annular flat shoulder adapted to face a corresponding annular flat shoulder on the other of said pipes, each said annular shoulder being disposed adjacent the end of its pipe to be secured to the other of said pipes; each of said pipes also having an annular bead between its shoulder and the adjacent end of said pipe; annular means comprising a pair of semi-circular members of resilient rubber-like material disposed about the junction of said pipes between their facing shoulders; means disposed about said resilient members for drawing therein inwardly against said pipes; and a reinforcing member of inwardly opening channel-shaped cross-section embedded within each of said resilient members, the sides of each channel-shaped reinforcing member being arranged to straddle said beads and each side of said channel-shaped reinforcing members having a minimum internal radius smaller than the maximum radius of the adjacent one of said beads.

WILLIAM H. FRANCISCO, JR.
EDWARD C. STEINER.
HENRY C. HILL.

REFERENCES CITED

The following references are of record in the file of this patent:

UNITED STATES PATENTS

| Number | Name | Date |
| --- | --- | --- |
| 2,272,650 | Von Veh | Feb. 10, 1942 |

FOREIGN PATENTS

| Number | Country | Date |
| --- | --- | --- |
| 34,635 | Great Britain | July 12, 1885 |
| 355,620 | France | Sept. 6, 1905 |